UNITED STATES PATENT OFFICE.

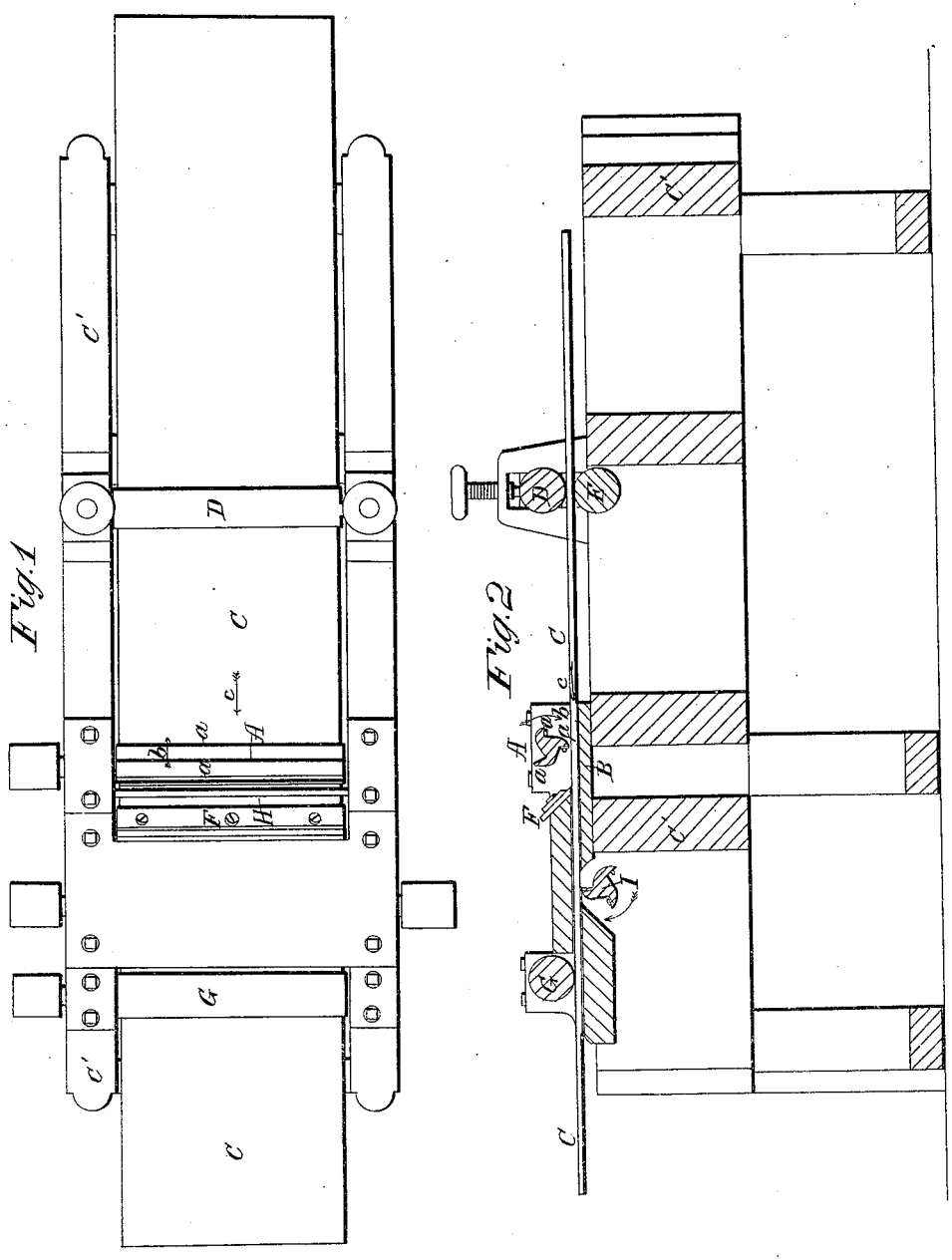

NICHOLAS G. NORCROSS, OF LOWELL, MASSACHUSETTS.

PLANING-MACHINE.

Specification of Letters Patent No. 9,058, dated June 22, 1852.

*To all whom it may concern:*

Be it known that I, NICHOLAS G. NORCROSS, of Lowell, in the county of Middlesex and State of Massachusetts, have invented an Improved Machine for Planing Boards and Reducing Them to an Even Thickness; and I do hereby declare that the same is fully described and represented in the following specification and the accompanying drawings, letters, figures, and references thereof.

Of the said drawings Figure 1 denotes a top view and Fig. 2 a central, vertical, and longitudinal section of my said improved machine.

In the drawings A represents a cutter cylinder or rotary series of planes $a$, $a$, $a$, placed above a bench or rest B, that is supported by a frame C'. The said cutter cylinder is to be made to revolve in the direction denoted by the arrow $b$, that is to say, it revolves not in a direction against the grain of the wood or adverse to that in which the board is moved, but in the direction in which the board C is moved under it, or so as to cut from the unplaned surface of the board toward its planed surface. The directions in which its planes are arranged are shown in the drawings.

C represents a board laid on the machine and fed or moved forward in the direction denoted by the arrow $c$ and by means of feed rollers, D, E, or other suitable feeding mechanism. In advance of the rotary cutter cylinder A I make use of a straight, stationary, inclined, plane iron F, arranged quite near to the path of the knife edges of the cutter cylinder.

G is an emery or smoothing drum, its external curved surface being provided with teeth like that of a file, or covered with an abrasive material that shall smooth and finish the board after the plane F has performed its function on it. The drum G may be made with a corrugated or waving surface, such as will produce such grooves in the wood as will cause it to present a grained appearance.

Through an opening in the bench B and so as to operate on the under side of the board I arrange another cutter cylinder I which I cause to rotate so that its cutters shall cut against the grain of the wood, or from its planed surface toward its unplaned surface, the said cutters being arranged with respect to those of the upper cutter cylinder as seen in Fig. 2.

Among those skilled in the art of planing wood by what is termed automatic planing machines, the planing machines of Roguin, Daniel Hill and William Woodworth are well understood. A description of that of said Daniel Hill will be found in the specification of Letters Patent of the United States granted to me on the twelfth day of February A. D. eighteen hundred and fifty. A drawing of the machine of Roguin to which I allude, a patent on which was granted in France on the thirtieth day of March A. D. eighteen hundred and eighteen, will be found in volume XXIII, plate 28, of the well known French publication entitled "Descriptions des Machines et Procédés Consignés dans les Brevets d'Inventions de Perfectionnement et d'Importation." The machine of William Woodworth was patented in the United States on the twenty seventh of December A. D. eighteen hundred and twenty eight. Hill's machine had a rotary cutter cylinder which was placed directly underneath the surface of the board to be planed, and cut away the lower surface of it, while the board was supported and moved on a bench or rest. This machine could not reduce a board to an equal thickness when not of an equal thickness, yet it contained a means of preventing the board from being drawn downward toward the rotary planing cylinder while it was in operation, such means being the bench or platform on which the board rested. The rotary series of planes or cutter cylinder of Hill cut the board from its planed toward its unplaned surface.

The machine of Roguin above alluded to had its rotary series of knives or cutter cylinder placed above the bench on which the board rested, and it cut the board in a direction from its unplaned to its planed surface.

The practical working of machines like that of Roguin to which I have referred has been attended with a difficulty. This difficulty arose from the fact that the edges of the cutters of its planing cylinder before passing into the board struck directly against the rough unplaned surface of it. This rough surface being generally more or less dirty or generally more or less covered with earthy or gritty matter would cause the edges of the cutters to soon become dulled or so uneven as to render them unfit to make smooth work.

To obviate the difficulty experienced by such machines as that of Roguin, to reduce a board to an even thickness throughout and to prevent the board at the same time from being drawn upward toward the rotary cutter knives and by the action of the same Woodworth arranged the cutter cylinder of his machine above the board, caused the cutter cylinder to rotate so as to cut in a direction from the planed to the unplaned surface of the board, and provided the machine with rollers to hold the board down and counteract the tendency of the cutters to elevate it. There still remains a difficulty in the Woodworth machine, and one incident to all such machines as plane by a rotary series or cylinder of planes alone, this difficulty consisting in their leaving the board ridged transversely on its planed surfaces. The surface planed is not a plane surface, but one made up of a series of many slightly curved surfaces.

My improved machine is intended to not only reduce a board to an even thickness and on its upper surface by means of a rotary cutter cylinder, but to reduce the planed surface to a plane surface or a plane surface grained or made corrugated in a longitudinal direction. It also if desirable can be made to reduce the under side of the board at the same time so as to take an even thickness of woody matter therefrom. My machine does not contain the invention or improvement of William Woodworth for I make use of no rollers or their equivalent to hold the board down or counteract any tendency of the rotary cutter cylinder to lift it, for the reason that the manner in which my upper cutter cylinder operates on the board is the reverse of that of Woodworth and tends to force the board down on the bench instead of raising it off the same. My rotary cutter cylinder is used to take off the rough surface of the board and reduce it so that the stationary plane can next operate and make on it a plane surface.

By placing the stationary cutter close up or near to the path of the revolving knives the ribbon shaving made by the former will be cut up and thrown off by the latter, an advantage being thus gained over the machines that use stationary planes alone, for in using such machines it is well known that the services of an attendant are necessary to effect the removal of the shaving, the same being done by manual labor.

I do not claim as my invention the combination of one or more stationary planes so arranged that while one or more remove the rough surface of a board, the rest or last shall finish or produce on it a smooth plane surface; but

I claim—

When placed so as to operate on one side of a board, a cylindrical rotary cutter for roughing and reducing which cuts from the unplaned to the planed surface, in combination with a stationary cutter placed behind and as near thereto as may be for finishing, without pressure rollers or pressure bars of any kind, whereby I am enabled to operate with greatly diminished power and the rotary cutter will cut up and throw off the shavings from the stationary cutter, and the boards will be reduced to an equal thickness and a smooth surface.

In testimony whereof I have hereto set my signature, this thirty-first day of May A. D. 1852.

N. G. NORCROSS.

Witnesses:
R. H. Eddy,
G. W. Cutler.